(No Model.)

P. JAISOHN.
THERMOMETER CASE.

No. 545,366.  Patented Aug. 27, 1895.

WITNESSES
G. A. Pennington
Chas. W. Stokes

INVENTOR
Philip Jaisohn,
by L. S. Bacon
Attorney

UNITED STATES PATENT OFFICE.

PHILIP JAISOHN, OF WASHINGTON, DISTRICT OF COLUMBIA, ASSIGNOR TO ALFRED A. SMITH, OF SAME PLACE.

THERMOMETER-CASE.

SPECIFICATION forming part of Letters Patent No. 545,366, dated August 27, 1895.

Application filed April 23, 1895. Serial No. 546,942. (No model.)

*To all whom it may concern:*

Be it known that I, PHILIP JAISOHN, a citizen of the United States, residing at Washington, in the District of Columbia, have invented certain new and useful Improvements in Thermometer-Cases; and I do hereby declare the following to be a full, clear, and exact description of the invention, such as will enable others skilled in the art to which it appertains to make and use the same.

This invention relates to an improvement in cases for pocket-thermometers for physicians' use; and it consists in the construction and arrangement of parts hereinafter described, and definitely pointed out in the claims.

The aim and purpose of the invention is the provision of an improved case for physicians' thermometers which will be adapted to receive or contain an antiseptic material, so that the thermometer will at all times be thoroughly sterilized or cleansed of bacteria or microscopic organisms and at the same time will be held from contact with the antiseptic liquid or substance. Heretofore thermometer-cases have been fashioned to receive and closely hold the glass thermometers used by physicians for taking the temperature of patients. Each time the thermometer is used it requires thorough cleansing and sterilizing. It often happens that the means for so cleansing are not at hand and the thermometer is placed in the case without cleansing, the danger of which is obvious.

Primarily the aim and purpose of my invention is to so fashion a case that the sterilizer or antiseptic agent will act on the thermometer as soon as it is placed in the case and effectually destroy all germs or bacteria which may have been left thereon and at the same time prevent the antiseptic from coming in contact with the instrument.

To this end the invention consists in the construction illustrated in the accompanying drawings, wherein like letters of reference indicate corresponding parts in the several views, and in which—

Figure 1:
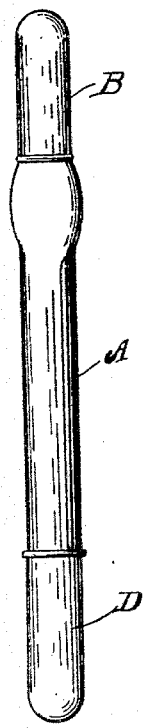
Figure 2:
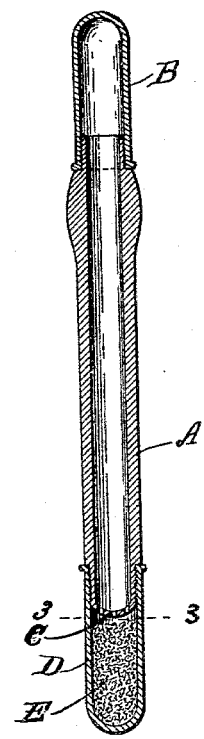
Figure 3:
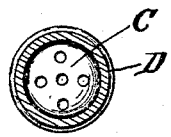

Figure 1 is an elevation of the case. Fig. 2 is a vertical section. Fig. 3 is a cross-section on the line 3 3, Fig. 2.

In the drawings, A designates the cylindrical case having the removable cap B, of usual and well-known form. The thermometer (not shown) is adapted to closely fit the case, but owing to its irregularity there are unoccupied spaces at the sides, so that a free circulation may be had around the thermometer. The lower end of the case is provided with male threads and is partly closed by a perforated diaphragm C.

D represents a removable receptacle formed preferably to constitute a cap or continuation of the holder. This receptacle has a closed lower end, the walls of which are threaded and engage the threads on the lower end of the case. Within the receptacle-extension is placed an absorbent material E, preferably cotton, which is saturated with an evaporable antiseptic solution, preferably "formelin."

When the thermometer is placed in the holder and the cap secured in place, the vapor arising from the antiseptic will penetrate all parts of the carrying-chamber and effectually destroy all bacteria on the thermometer, rendering the same clean and permitting its use without danger of infection or contagion and without washing before use. Were the instrument immersed in the liquid it would necessitate rewashing before use and thus subject the same to the danger of further infection. Again, were the antiseptic employed poisonous it would be an element of danger and require a thorough washing after being taken from the case. By the use of the perforated end or partition the thermometer is held from entering the antiseptic chamber; but the fumes, which are equally as effective for sterilizing, will pass into the case and destroy all germs on the instrument.

It is to be understood that I do not limit myself to the construction shown and described, for it is apparent that many changes can be made without in the least departing from the nature and principle of my invention.

Having thus described my invention, what I claim as new, and desire to secure by Letters Patent, is—

1. In a physician's thermometer case, the combination with the case proper, of an auxiliary receptacle on the case, and a fixed partition located between the receptacle and interior of the case, having an opening therein, whereby a communicating passage is formed between the interior of the case and receptacle, and the instrument is prevented from moving into the receptacle, substantially as described.

2. In a physician's thermometer case, the combination with the thermometer holding case and means for opening and closing the same, an auxiliary receptacle on the case, and a fixed perforated partition between the interior of the receptacle and interior of the case, substantially as described.

3. In a physician's thermometer case, the combination with the case having a fixed perforated end, of a cap for the perforated end, fashioned to constitute a receptacle, and means for removably securing the cap on the case, substantially as described.

4. In a physician's thermometer, the combination with a case for the thermometer having a fixed perforated section, a closure for the case, and a closed receptacle secured to the case over the perforations and communicating with the interior of the case through the perforations, substantially as described.

In testimony whereof I affix my signature in presence of two witnesses.

PHILIP JAISOHN.

Witnesses:
ALFRED A. SMITH,
L. S. BACON.